(12) United States Patent
Chen

(10) Patent No.: US 11,085,487 B2
(45) Date of Patent: Aug. 10, 2021

(54) POSITIONING LOCKING MECHANISM OF ROTATIONAL MEMBER

(71) Applicant: Xiaoming Chen, Richmond Hill (CA)

(72) Inventor: Xiaoming Chen, Richmond Hill (CA)

(73) Assignee: Xiaoming Chen, Richmond Hill, CA (US)

( * ) Notice: Subject to any disclaimer, the term of this patent is extended or adjusted under 35 U.S.C. 154(b) by 616 days.

(21) Appl. No.: 15/973,943

(22) Filed: May 8, 2018

(65) Prior Publication Data
US 2019/0162228 A1    May 30, 2019

(30) Foreign Application Priority Data

Nov. 24, 2017   (CN) ......................... 201721602433.X

(51) Int. Cl.
*F16C 11/10*    (2006.01)
(52) U.S. Cl.
CPC ..... *F16C 11/103* (2013.01); *Y10T 403/32336* (2015.01)
(58) Field of Classification Search
CPC .... F16B 2/16; F16B 2/18; F16B 9/023; F16C 11/10; F16C 11/103; Y10T 403/32262; Y10T 403/32327; Y10T 403/32336; Y10T 403/32361; Y10T 403/32451; Y10T 403/32557; Y10T 403/591; Y10T 403/592; Y10T 403/598; Y10T 403/599; Y10T 403/602
USPC ............ 403/84, 92, 93, 96, 107, 113, 322.1, 403/322.2, 324, 325, 327
See application file for complete search history.

(56) References Cited

U.S. PATENT DOCUMENTS

| | | | | |
|---|---|---|---|---|
| 4,463,632 A * | 8/1984 | Parke | ..................... | B25G 1/063 403/93 |
| 6,216,317 B1 * | 4/2001 | Chen | ..................... | B25G 1/063 403/84 |
| 6,216,567 B1 * | 4/2001 | Hu | ......................... | B25G 1/063 81/177.6 |
| 6,520,053 B2 * | 2/2003 | Liao | ...................... | B25G 1/066 81/177.4 |
| 6,767,153 B1 * | 7/2004 | Holbrook | ............... | F16C 11/10 403/115 |
| 6,857,341 B1 * | 2/2005 | Cheng | .................... | B25G 1/063 81/177.7 |
| 7,082,862 B2 * | 8/2006 | Lee | ......................... | B25G 1/063 81/177.7 |
| 7,174,815 B1 * | 2/2007 | Hsieh | ..................... | F16C 11/10 403/93 |
| 7,237,460 B2 * | 7/2007 | Hu | ........................ | B25B 13/463 192/43.2 |
| 8,695,459 B2 * | 4/2014 | Lee | ...................... | B25B 13/461 403/93 |
| 9,452,515 B2 * | 9/2016 | Lee | ..................... | B25B 23/0028 |

(Continued)

*Primary Examiner* — Josh Skroupa
(74) *Attorney, Agent, or Firm* — Arch & Lake LLP

(57) ABSTRACT

A positioning locking mechanism of a rotational member having a rotational positioning member provided with a positioning groove; a rotational member pivotally connected with the rotational positioning member and rotating around the rotational positioning member; a positioning member arranged in the rotational member and movably meshed with the positioning groove; and a locking operation member arranged in the rotational member to control the motion of the positioning member.

14 Claims, 23 Drawing Sheets

(56) References Cited

U.S. PATENT DOCUMENTS

| | | | |
|---|---|---|---|
| 9,638,243 B2* | 5/2017 | Li | F16C 11/10 |
| 10,436,426 B2* | 10/2019 | Thomas | F21L 14/04 |
| 2011/0297201 A1* | 12/2011 | Chen | E04H 15/42 |
| | | | 403/113 |
| 2012/0014744 A1* | 1/2012 | Lin | F16C 11/10 |
| | | | 403/91 |

* cited by examiner

POSITIONING LOCKING MECHANISM OF ROTATIONAL MEMBER

CROSS-REFERENCE TO RELATED APPLICATIONS

This application is based on and claims the benefit of priority from Chinese Patent Application No. 201721602433.X, filed on 24 Nov. 2017, the entire contents of which are incorporated by reference.

FIELD

The present disclosure relates to the field of rotational positioning technology, and more particularly, to positioning locking mechanism of a rotational member.

BACKGROUND

The statements in this section merely provide background information related to the present disclosure and may or may not constitute prior art.

Rotational members are mechanical structures which are widely used, and partial rotational members in daily use need to be located at a designed angle, such as a movable supporting leg of a camera support, a cam lever of a quick locking device, etc., so as to meet the requirements of use.

In conventional technologies, positioning and locking are usually realized by using bolts, pins, buckles or other methods; although the locking effect is reliable, and the operation is complicated, which is impossible to realize simple and rapid operation.

Therefore, it is necessary to design a new rotational locking structure that is firm in locking, and simple and rapid in operation.

SUMMARY

In order to overcome above deficiencies, the present disclosure provides a technical scheme of positioning locking mechanism of a rotational member with simple operation and reliable locking, and the positioning locking mechanism effectively ensures that the positioning and locking of the rotational member will not be invalid due to accident collision or component fatigue.

The technical solution described in the present disclosure to overcome above deficiencies is as follows.

A positioning locking mechanism of a rotational member comprises a rotational positioning member provided with a positioning groove; a rotational member pivotally connected with the rotational positioning member and rotating around the rotational positioning member; a positioning member arranged in the rotational member, and meshed with or separated from the positioning groove through a locking operation member; wherein the positioning member is designed into a geometry adapted to and meshed with the locking operation member and the positioning groove; and the locking operation member arranged in the rotational member to control the positioning member to be meshed or separated; wherein the working mode of the locking operation member may be axial movement or radial rotation. the locking operation member is provided with an accommodating groove or an accommodating concave hole for containing the positioning member; wherein, when the locking operation member implements a locking motion, the positioning member is pushed up to enter the positioning groove under the rotational driving of the rotational member, the positioning member is kept to mesh with the positioning groove, and the rotational member cannot rotate to realize positioning and locking under the effect of the positioning member and the positioning groove; and when the locking operation member is operated to implement an unlocking motion, the locking operation member is pressed, the accommodating groove is moved to the position where the positioning member is located, and the positioning member falls into the accommodating groove to completely separate from the positioning groove, so that the rotational member can rotate to realize unlocking.

The positioning locking mechanism of a rotational member according to the present disclosure has the beneficial effect that: the rotational positioning member is provided with the positioning groove, the rotational member is internally provided with the movable positioning member and the locking operation member, and the rotational positioning member realizes positioning and locking, or unlocking to the rotational member through the positioning member controlled by the locking operation member. The positioning locking mechanism according to the present disclosure abandons the positioning locking modes of bolt, pin, buckle, etc. in conventional technology, overcoming complicated operation, difficulty in quick locking and unlocking in conventional technology, and has the advantages of simple and compact structure, quick operation, firm locking and reliable installation and so on.

Further areas of applicability will become apparent from the description provided herein. It should be understood that the description and specific examples are intended for purposes of illustration only and are not intended to limit the scope of the present disclosure.

DRAWINGS

The present disclosure is further described hereinafter with reference to the drawings and the embodiments.

DETAILED DESCRIPTION

The present disclosure is further described hereinafter with reference to the drawings and the embodiments. Some parts and working principle referred as follows can be mutually and commonly used between embodiments on the premise of having no conflict, and each embodiment demonstratively describes the application of a positioning locking mechanism of a rotational member according to the present disclosure in various mechanical devices.

Figure 1:
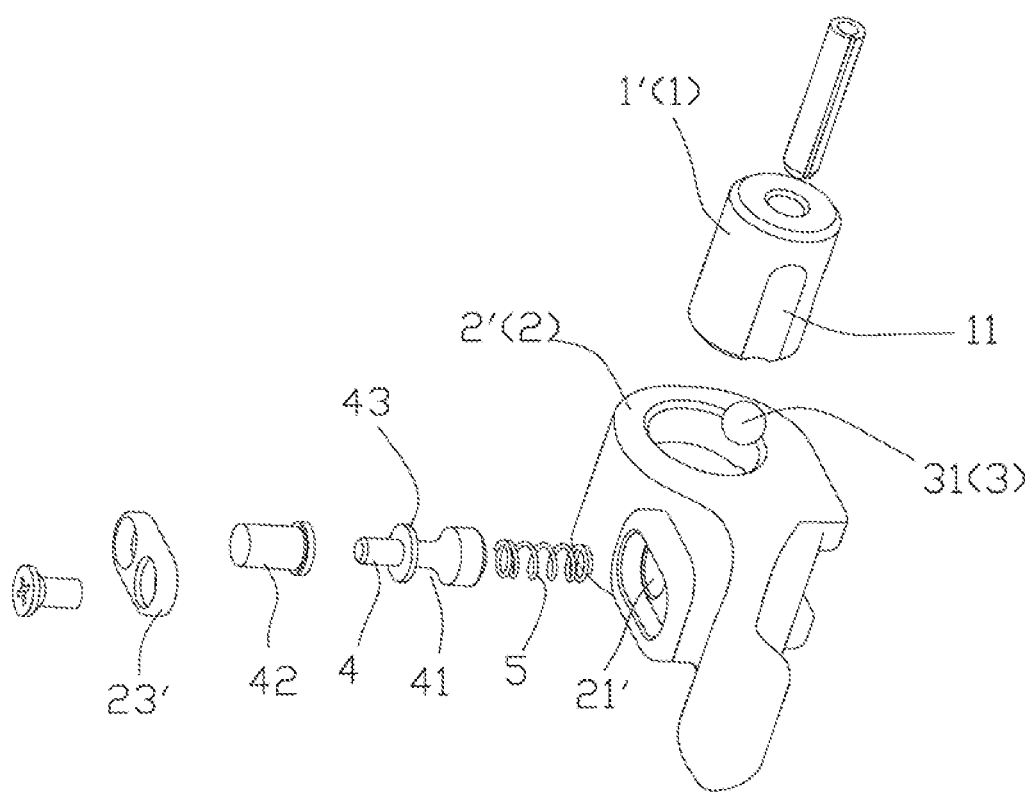
FIG. 1 is a decomposed schematic diagram of an embodiment 1 according to the present disclosure.
Figure 2:
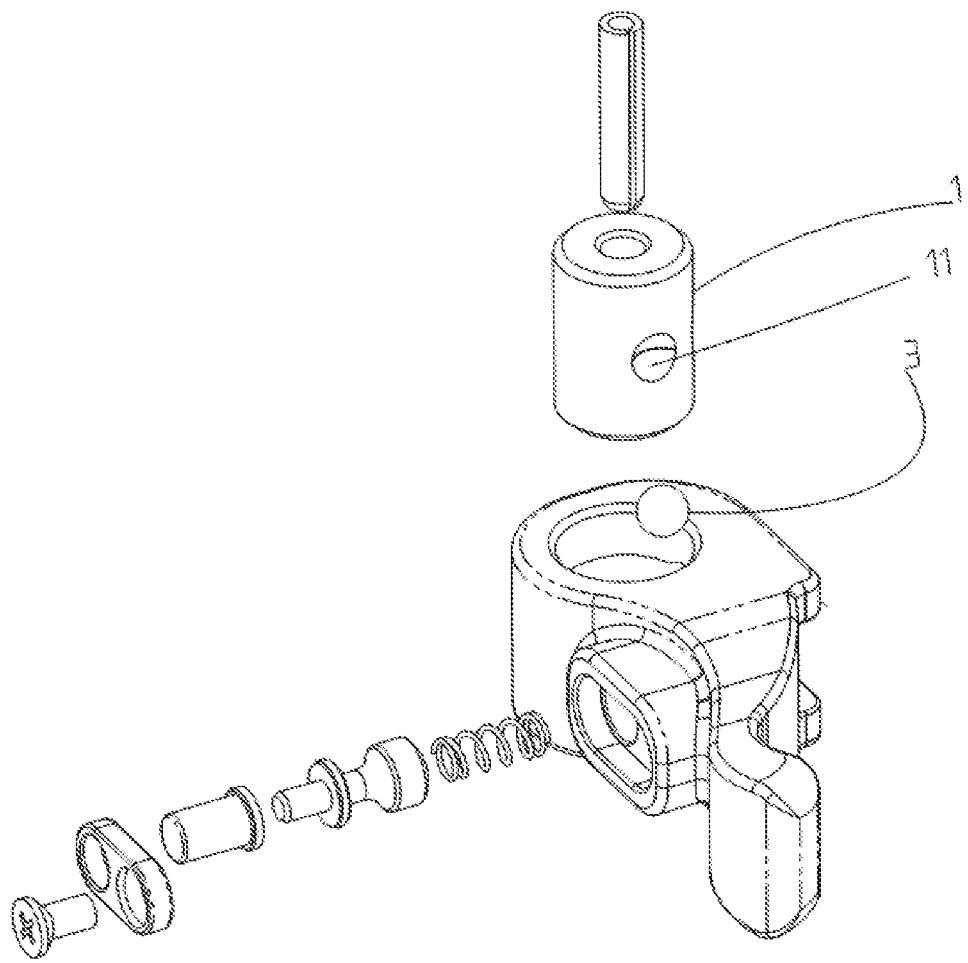
FIG. 2 is another decomposed schematic diagram of the embodiment 1 according to the present disclosure, wherein a positioning groove is in a convex-hole shape.
Figure 3:
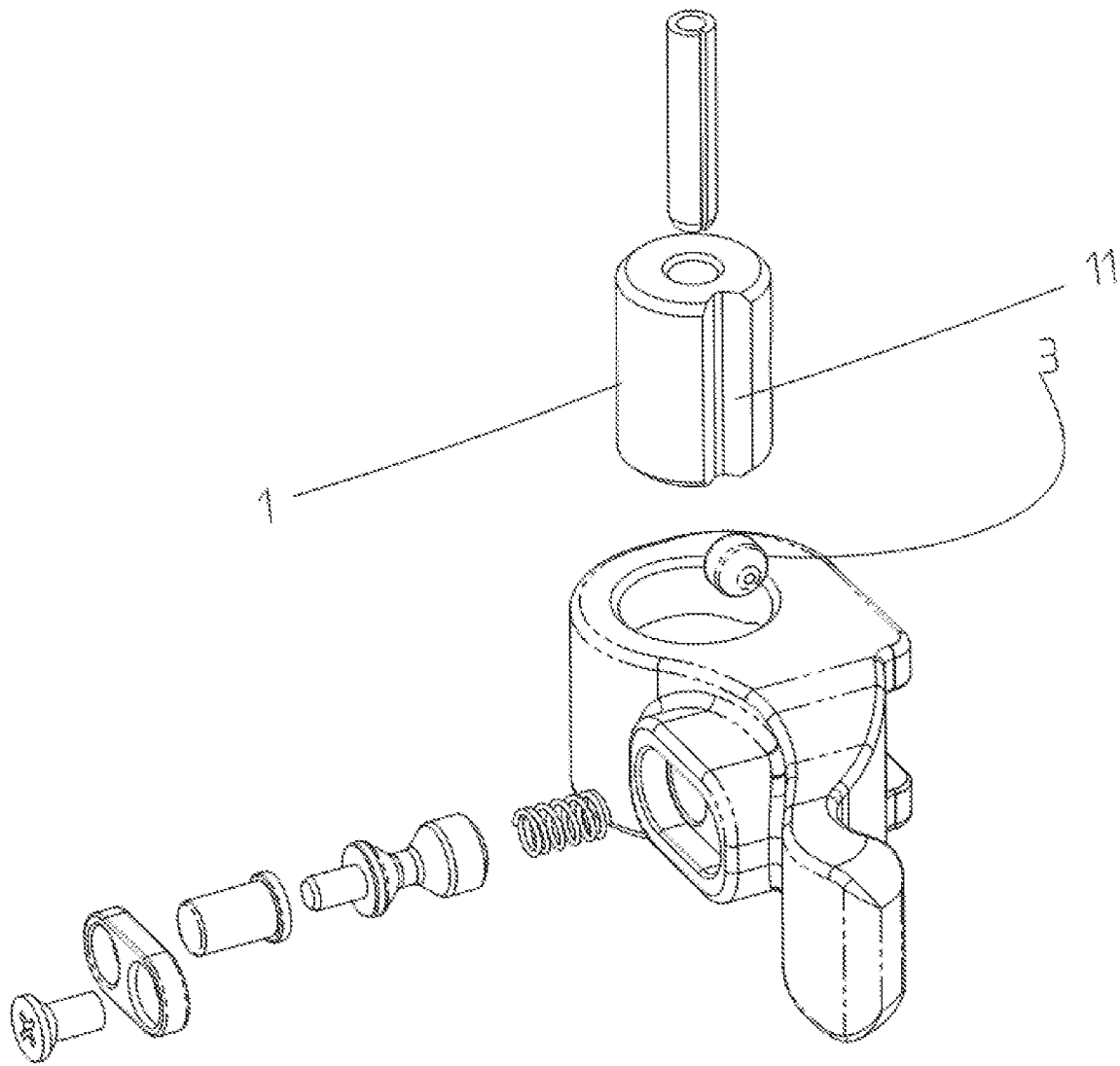
FIG. 3 is another decomposed schematic diagram of the embodiment 1 according to the present disclosure, wherein a positioning groove is a V-shape groove, and a positioning member has a cylinder with a V-shape end surface.
Figure 4:
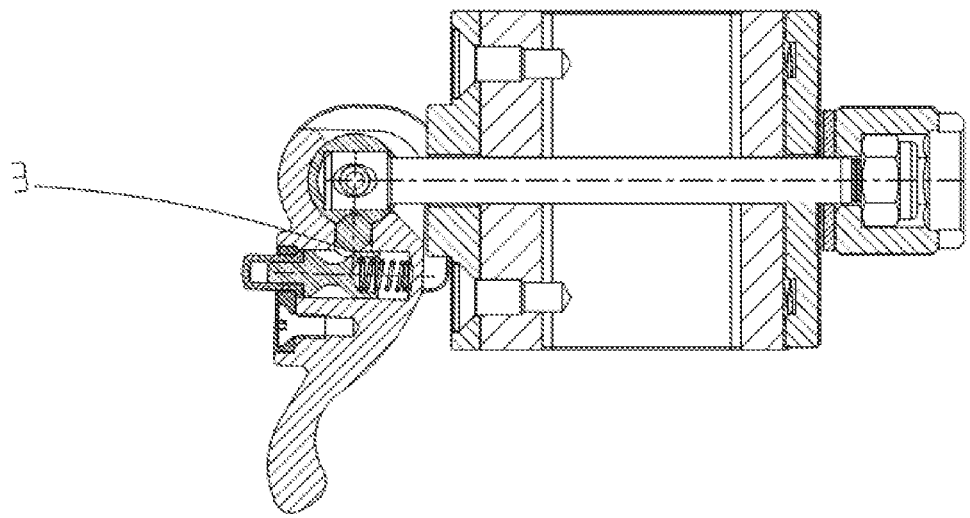
FIG. 4 is a structural schematic diagram of a positioning locking mechanism in a positioning and locking state according to FIG. 3.

Firstly, the positioning locking mechanism of a rotational member according to the present disclosure is described in principle as follows:

With reference to FIG. 1 to FIG. 18 for details, the positioning locking mechanism according to the present disclosure comprises a rotational positioning member 1 and a rotational member 2 pivotally connected with the rotational positioning member 1 and rotating around the rotational positioning member 1, the rotational positioning member 1 is provided with a positioning groove 11, the positioning groove 11 can specifically be the structures of a groove, a convex hole, a counter hole, a through hole, a round hole or a strip-type groove, as shown in FIG. 2, the positioning groove 11 can be in a shape of the convex hole, further referring to FIG. 3 and FIG. 4, the positioning groove 11 can be a V-shape groove, at the moment, a positioning member 3 can be a cylinder with an end surface in a single V-shape, such as being called as a V-shape top cylinder, the rotational member 2 is internally provided with a movable positioning member 3 and a locking operation member 4, the locking operation member 4 can be pushed up and keep the positioning member 3 to be clamped in the positioning groove 11, and in order to realize that the locking operation member 4 has the function of pushing up and keeping the positioning member 3 to be meshed with the positioning groove 11, one end of the locking operation member 4 is advantageously connected to an elastic member 5.

The elastic member 5 is advantageous to be a pressure spring, the locking operation member 4 can push up and keep the positioning member 3 to be clamped in the positioning groove 11 under the effect of the pressure spring. At the moment, a part of the positioning member 3 is located in the positioning groove 11, the other part of the positioning member 3 is located in the rotational member 2, so that the rotational positioning member 1 and the rotational member 2 cannot rotate under the limitation of the positioning member, thus realizing the positioning and locking.

The locking operation member 4 is provided with an accommodating groove 41 for containing the positioning member 3, the locking operation member 4 is operated, the accommodating groove 41 is moved to the position where the positioning member 3 is located, at the moment, the positioning member 3 falls into the accommodating groove 41 to separate from the limitation of the positioning groove 11, and the rotational member 2 can drive the positioning member 3 to rotate synchronously, so as to realize the unlocking.

In order to enable the positioning member 3 to be easily pushed up from the accommodating groove to be clamped in the positioning groove 11 by the locking operation member 4, one side wall of the accommodating groove 41 is designed into an arc-shaped surface or an inclined plane.

The present disclosure is further described in detail with reference to embodiment 1.

Embodiment 1 the rotational positioning member 1 is a spindle 1', the rotational member 2 is a cam lever 2', and the spindle 1' and the cam lever 2' are applied to a quick locking device, which refers to FIG. 1 to FIG. 6 for details.

In the embodiment, in order to realize the installation of a locking operation member 4, the cam lever 2' is internally provided with a first installation channel 21' used for installing the locking operation member 4, the first installation channel 21' is set with an closed end and an opening end, the locking operation member 4 is installed in the first installation channel 21', one end of the locking operation member 4 extends out from the opening end of the first installation channel 21' to be sleeved with an operating button 42, the operating button 42 is set to facilitate the operation, and the operating button 42 can be made of flexible material such as rubber material or plastic material to increase the comfortable sensation of operation.

A limiting plate 23' is installed on the opening end of the first installation channel 21', the limiting plate 23' can be fixed by a bolt, the operating button 42 sleeve the locking operation member 4, the operating button 42 extends outwardly through an installing hole of the limiting plate 23', a flange ledge at the other end is butted with an inner side of the limiting plate 23' to limit in an axial direction, which can ensure that the locking operation member 4 is reliably installed in the first installation channel 21'.

Figure 5:
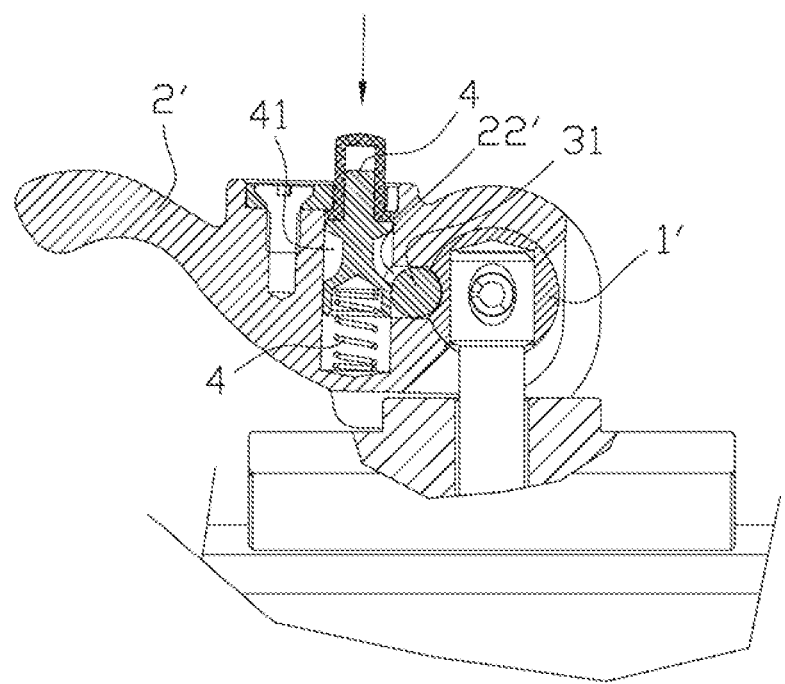
FIG. 5 is a structural schematic diagram of the positioning locking mechanism in a positioning and locking state in the embodiment 1.

In the embodiment, the positioning member 3 is a sphere 31, the cam lever 2' is internally provided with a second installation channel 22' used for installing the sphere 31, one end of the second installation channel 22' communicates with the spindle 1', the other end of the second installation channel 22' communicates with the first installation channel 21', which refers to FIG. 5 for details, when the sphere 31 in the second installation channel 22' is pushed up to the positioning groove 11, a part of the sphere 31 is meshed with the positioning groove 11, the other part of the sphere 31 is located in the first installation channel 21', the cam lever 2' is limited by the sphere 31 and cannot rotate around the spindle 1', thus realizing the positioning and locking to the cam lever 2'. At the moment, even though the cam lever 2' is touched, the cam lever 2' can also be limited by the sphere 31 so as to be unable to rotate. As described in following application example and corresponding FIGS. 7 to 9, a tensioning state of a pulling rod 74 is ensured to be kept through the cam lever 2', which ensures that the quick locking device always involves in a locking state relative to a guide rail, and ensures the safety and reliability in working.

Figure 6:
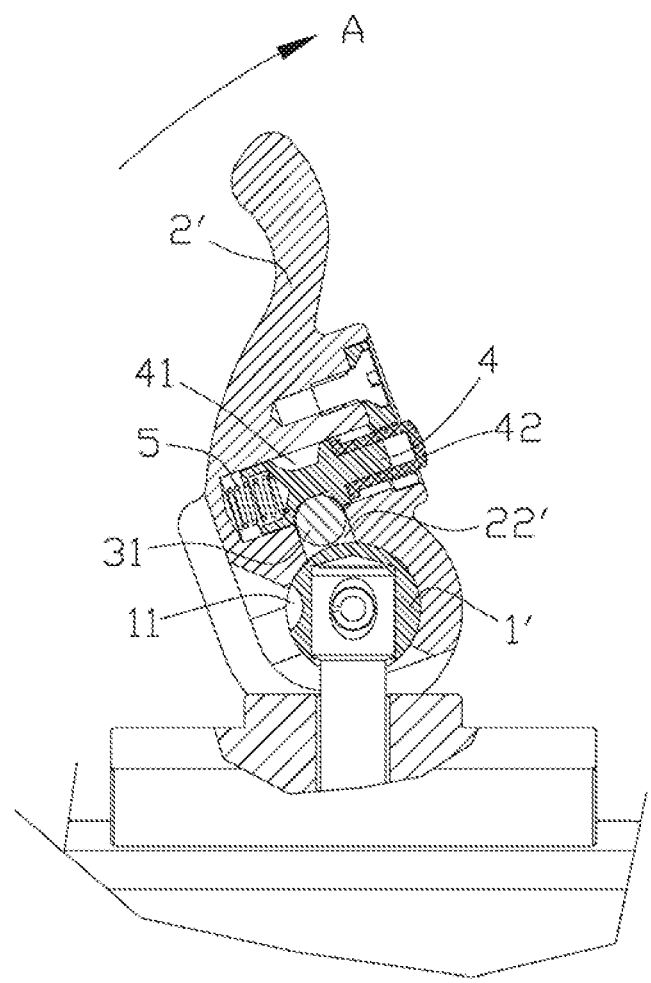
FIG. 6 is a structural schematic diagram of the positioning locking mechanism in an unlocking state in the embodiment 1.
Figure 7:
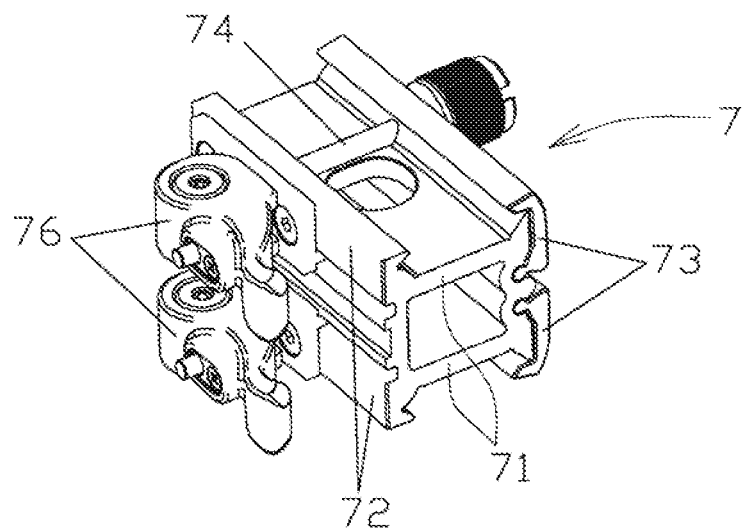
FIG. 7 is a stereo chemical schematic diagram of an application example of the embodiment 1 in a quick locking device.
Figure 8:
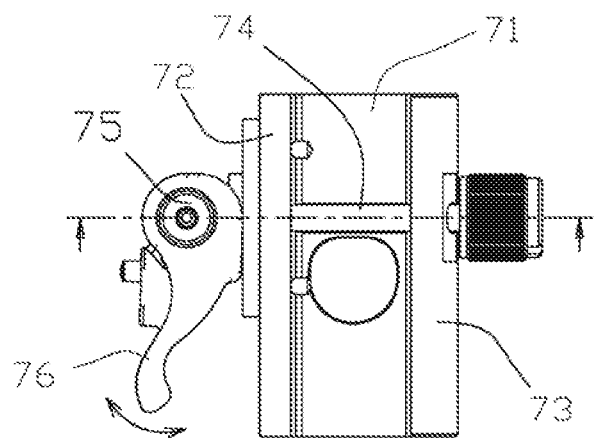
FIG. 8 is a main projection view of FIG. 7.
Figure 9:
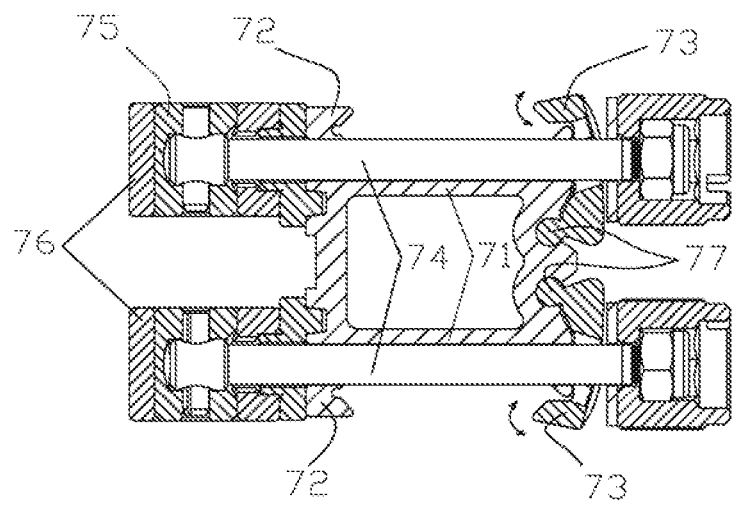
FIG. 9 is a cross-section view of FIG. 8.

With reference to FIG. 5 for details, when an axial force is implemented to the operating button 42 to enable the locking operation member 4 to move inwardly, when an accommodating groove 41 thereof is corresponding to the position at which the sphere 31 is located, the sphere 31 falls into the accommodating groove 41 to separate from the positioning groove 11, thus relieving the positioning and locking, at the moment, the cam lever 2' rotates around the spindle 1' in the direction pointed by the arrow A in FIG. 6 as described in the following application example and corresponding FIGS. 7 to 9; under an unlocking state, the cam lever 2' rotates a cam curved-surface around the spindle 1' to push the pulling rod 74 to move in an axial direction to enable a movable pressing groove 73 to be opened, the distance between a fixed pressing groove and the movable pressing groove is increased, and the quick locking device enables the guide rail to change into an unlocking state from a locking state, which can realize quick disassembly.

As an application of embodiment 1, the positioning locking mechanism described in embodiment 1 can be applied in a quick locking device 7, with reference to FIG. 7 to FIG. 9 for details, the quick locking device 7 comprises a fixing mount 71, the fixing mount is provided with two sets of relatively arranged fixed pressing grooves 72 and movable pressing grooves 73, the fixed pressing groove 72 and the movable pressing groove 73 are connected to a pivot shaft 75, the pivot shaft 75 is sleeved in an installing hole of a cam lever 76, the cam lever 76 is operated, the cam lever 76 can rotate around the pivot shaft 75, a circle center of the pivot shaft 75 is different relative to the distance from a cam curved-surface with the change of a cam curvature due to the curvature change of the cam curved-surface on the cam lever 76, so that when the cam lever 76 is operated to rotate, the pulling rod 74 is driven to move in an axial direction, and the movable pressing groove 73 is driven by the pulling rod 74 to swing through a spindle 77 so adjust an opening and closing distance of the fixed pressing groove 72 and the movable pressing groove 73 to realize the locking or unlocking.

The present disclosure is further described in detail with reference to an embodiment 2.

Embodiment 2 the rotational positioning member 1 is an installing support 1", the rotational member 2 is a movable supporting leg 2", the movable supporting leg 2" is pivotally connected with the installing support 1' through a shaft 25", the positioning groove 11 on the installing support 1" is arranged as a curved-surface, and the number of the positioning groove 11 is three. Referring to FIG. 11 to FIG. 14 for details.

Figure 10:
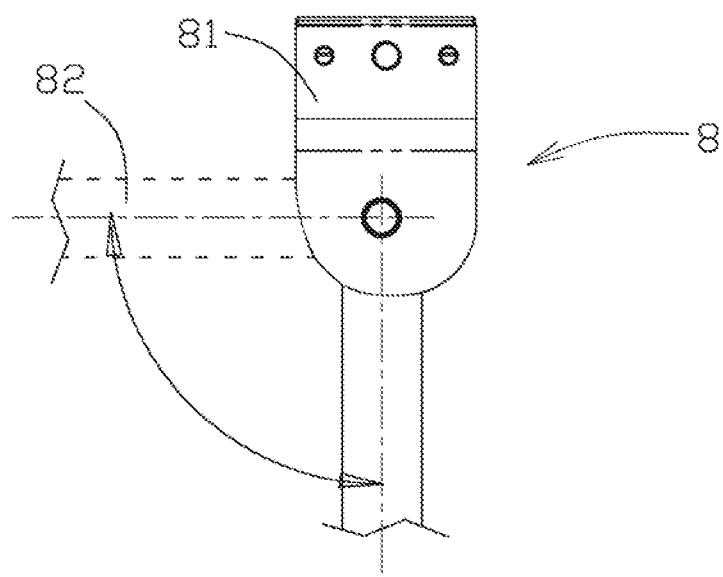
FIG. 10 is a structural schematic diagram of a supporting leg.
Figure 11:
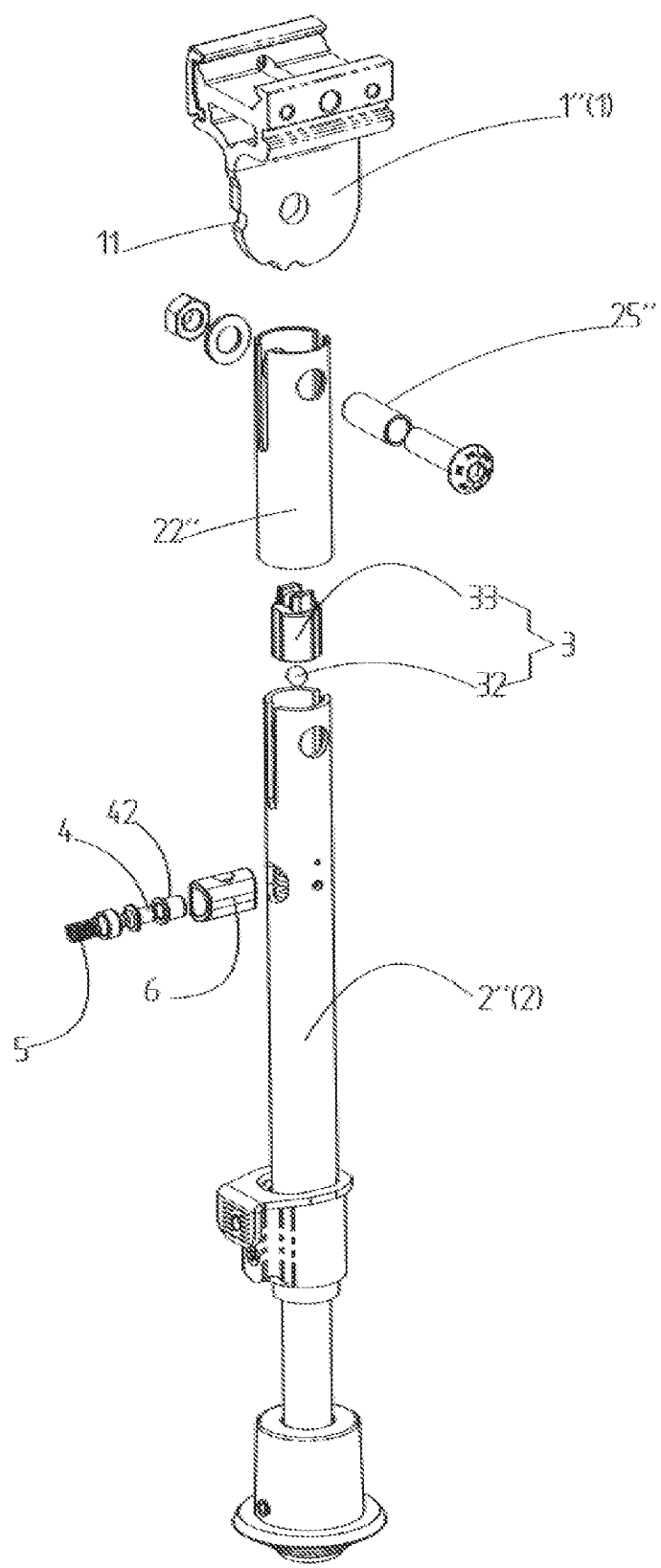
FIG. 11 is a decomposed schematic diagram of an embodiment 2 according to the projection.
Figure 12:
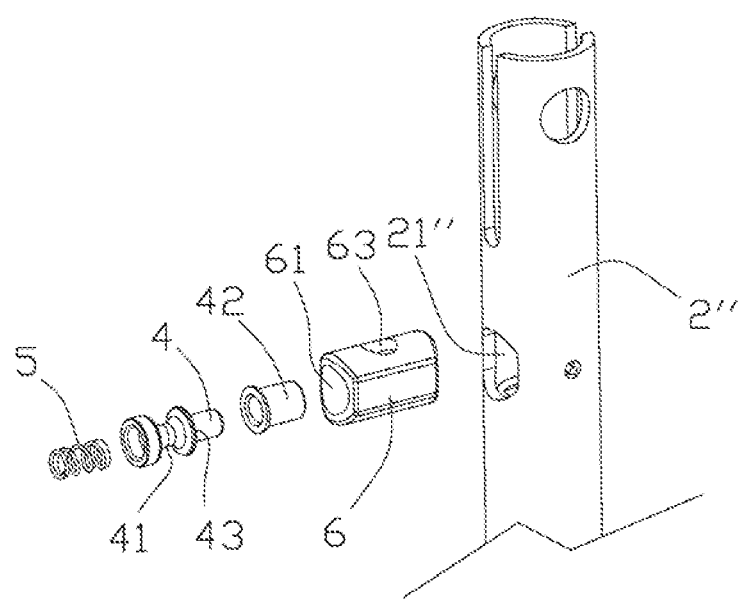
FIG. 12 is an exploded assembly view at the location of a locking operation member in the embodiment 2 of the present disclosure.
Figure 13:
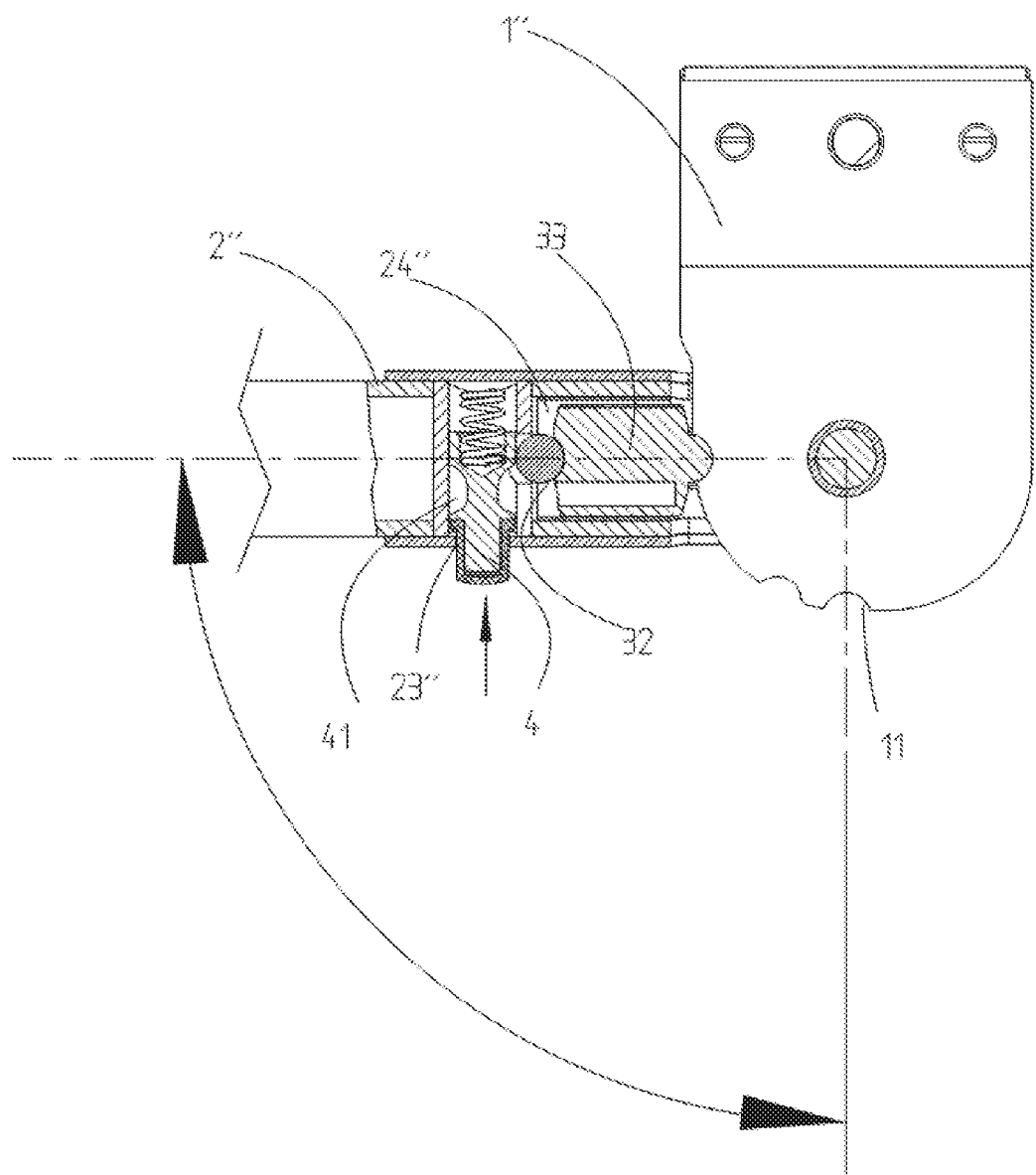
FIG. 13 and FIG. 14 are structural schematic diagrams of the positioning locking mechanism in a positioning and locking state in the embodiment 2 of the present disclosure.

FIG. 10 is a structural schematic diagram of a common supporting leg 8, which can be used for supporting a camera, a mechanical component, etc. comprising a installing support 81 and a movable supporting leg 82, the supporting leg has two states of a gathering state and a supporting state, and in order to avoid accident rotation of the movable supporting leg 82 in the gathering state and the supporting state, the movable supporting leg needs to be located and locked at a rotating angle as well.

In the embodiment, in order to realize the installation of the locking operation member 4, the movable supporting leg 2" is internally provided with a fixing mount 6 used for installing the locking operation member 4, the fixing mount 6 is internally provided with a third installation channel 61, the locking operation member 4 is installed in the third installation channel 61, and one end of the locking operation member 4 extends out from the third installation channel 61 to be sleeved with an operating button 42; and the setting of the operating button 42 facilitates manual operation, i.e., the operating button 42 can be pressed by a finger, the pressed operating button 42 can be made of flexible material such as rubber material or plastic material to increase the comfortable sensation of operation.

In order to facilitate the assembly, one end of the third installation channel 61 is through, a barrier wall 62 is provided in the third installation channel 61 at the other end of the third installation channel 61, the locking operation member 4 is provided with a limiting convex ledge 43 limited by the barrier wall 62, and the locking operation member 4 only needs to be placed in from the through end of the third installation channel 61 in assembly.

In the embodiment, the movable supporting leg 2" is provided with an axially penetrated containing hole 21", the fixing mount 6 is placed in the containing hole 21" and further comprises an outer sleeve 22" sleeved on the movable supporting leg 2", the outer sleeve 22" is coaxially pivotally connected with the movable supporting leg 2" through the shaft 25", two ends of the fixing mount 6 extend out from the containing hole 21" to be butted with an inside wall of the outer sleeve 22" and limited, and the outer sleeve 22" is further provided with a hole site 23" which is convenient for one end of the locking operation member 4 to extend out and be sleeved with the operating button 42. The locking operation member 4 is placed in from the through end of the third installation channel 61 in assembly, then a pressure spring is installed at an end part of the locking operation member 4, and then the outer sleeve 22" is sleeved on the movable supporting leg 2" and is coaxially pivoted, which is convenient and quick, and is reliable in connection.

In the embodiment, the positioning member 3 is composed of a spherical body 32 and a cylinder 33 (or also called as cylindrical top cylinder 33) butted with the spherical body 32, the cylinder 33 is provided with a cylindrical top, wherein the cylinder 33 is provided with a concave surface 34 matched with the spherical body 32, at a contacting surface of the cylinder 33. And at two sides of a cylindrical surface at the top of the cylinder 33, the cylinder 33 is provided with orienteering concave parts to prevent from rotating. The fixing mount 6 is provided with a fourth installation channel 63 for installing the spherical body 32, the fourth installation channel 63 is communicated with the third installation channel 61, the movable supporting leg 2" has an inner chamber 24" communicated with the positioning groove 11, the cylinder 33 is internally arranged in the inner chamber 24" and is in sliding fit with the inner chamber 24", with reference to FIG. 13 for details, the spherical body 32 pushes up the cylinder 33 to be clamped in the positioning groove 11 under the pushing-up effect of the locking operation member 4, and at the moment, the movable supporting leg 2" is limited by the cylinder 33 and unable to rotate, thus realizing the locking and positioning of the movable supporting leg 2". On the installing support, the positioning groove 11 can be arranged on a curved surface, a flat surface or a broken-line surface.

Figure 14:
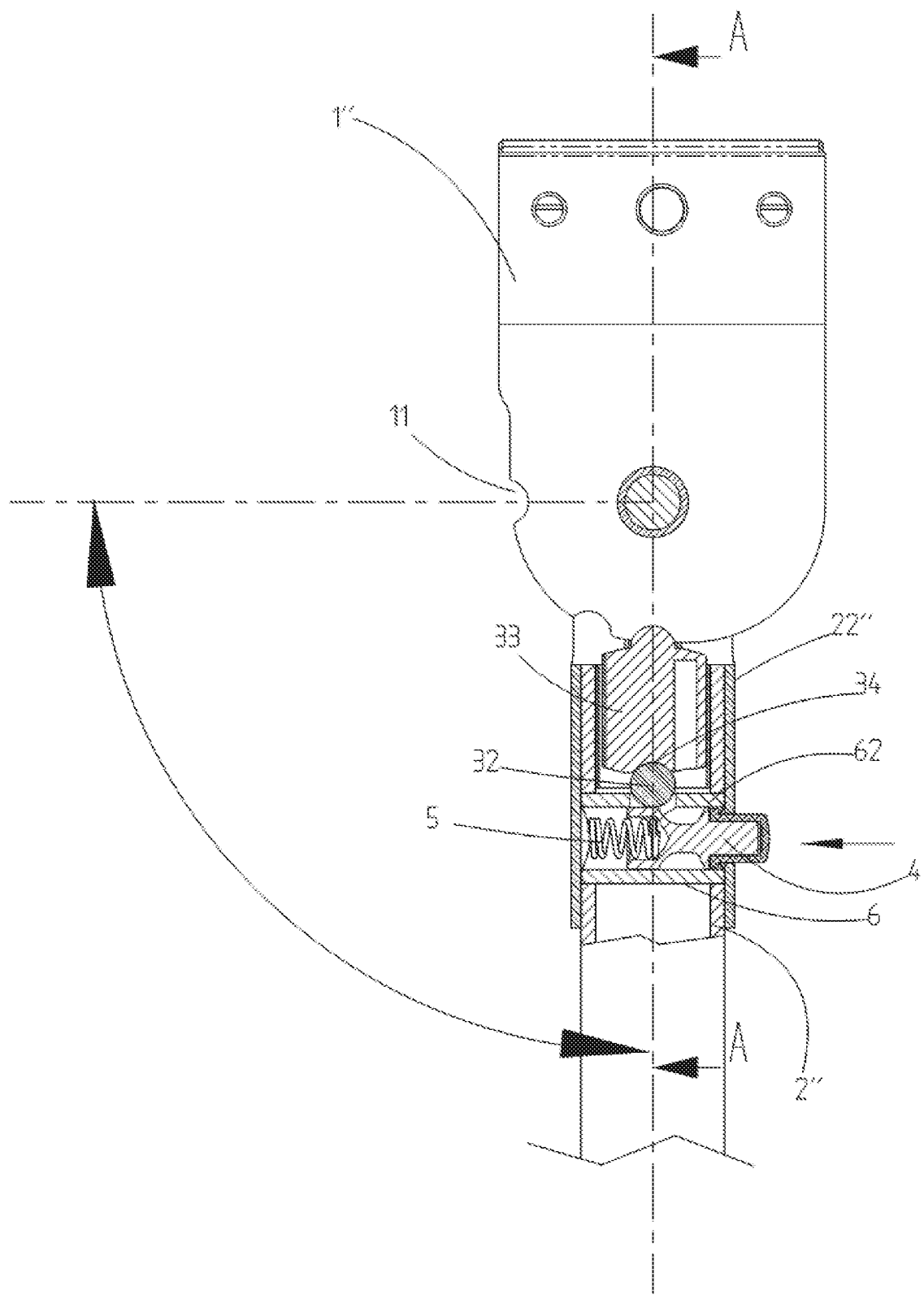
Figure 15:
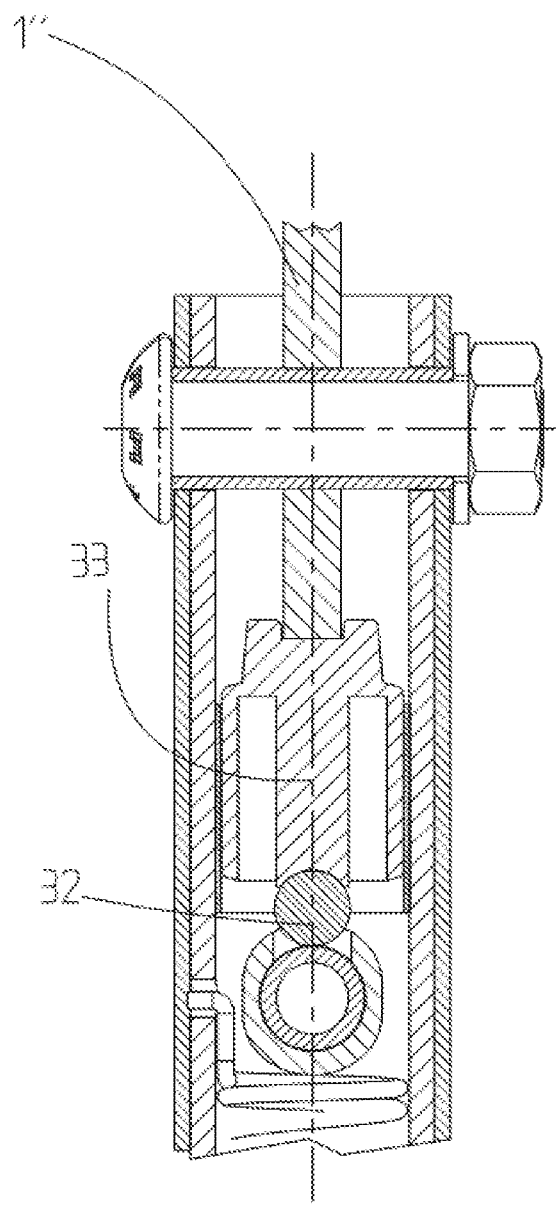
FIG. 15 is an A-A section view of FIG. 14.
Figure 16:
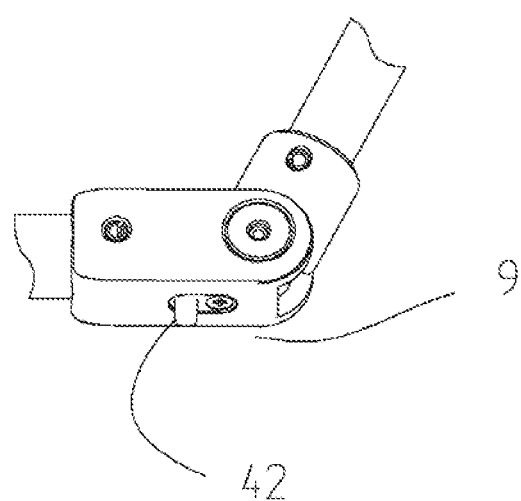
FIG. 16 is an overall schematic diagram of the positioning locking mechanism in the embodiment 3 of the present disclosure.
Figure 17:
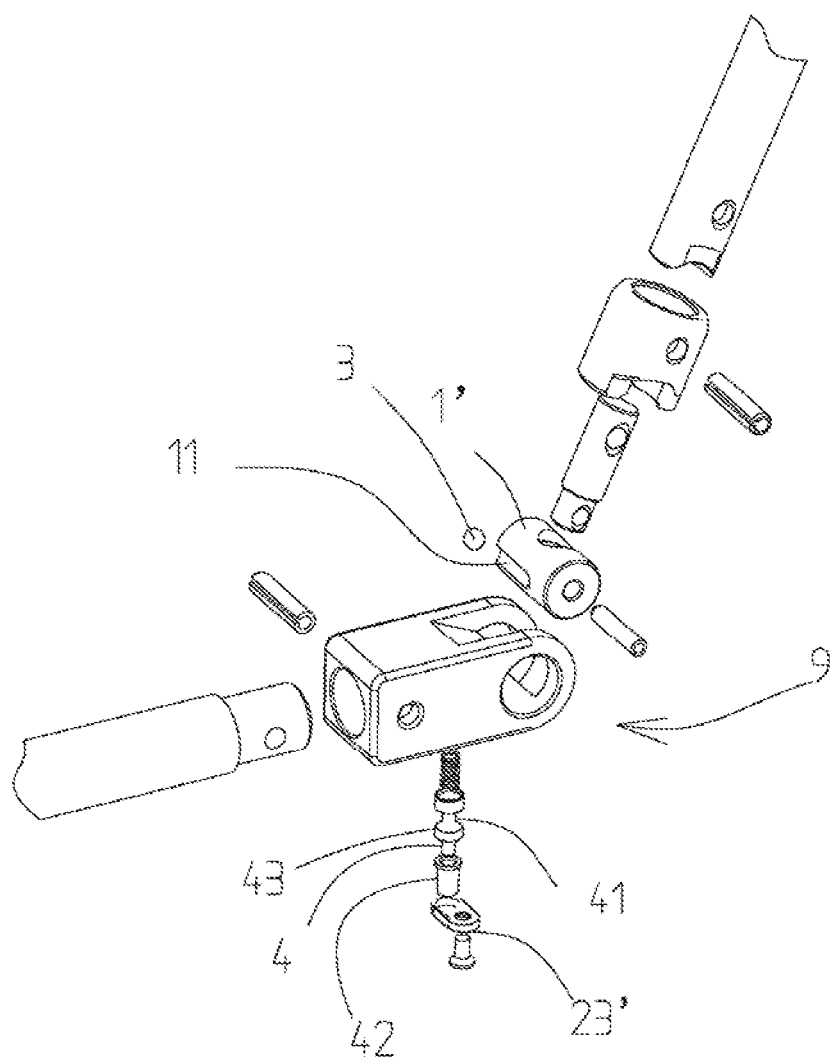
FIG. 17 is an exploded assembly view of the embodiment 3 according to the present disclosure.

When the movable supporting leg 2″ needs to be rotated to the state shown in FIG. 14, an axial force is implemented by a finger to the operating button 42 to enable the locking operation member 4 to move inwardly, an accommodating groove 41 located on the locking operation member 4 is synchronously moved to the position where the spherical body 32 is located to enable the spherical body 32 to fall into the accommodating groove 41 through the fourth installation channel 63, the cylinder 33 is separated from the positioning groove 11 to relieve the positioning and locking to the movable supporting leg 2″, and at the moment, the movable supporting leg 2″ can rotate to the state shown in FIG. 14.

When the force implemented to the locking operation member 4 is revoked, i.e., the finger is let go, an axial displacement occurs to the locking operation member 4 under the effect of the pressure spring to enable the spherical body 32 to be pushed up by the arc-shaped surface or the inclined plane of the accommodating groove 41 to move, the spherical body 32 pushes up the cylinder 33 to be clamped in the positioning groove 11, at the moment, the movable supporting leg 2″ is located and locked to the state shown in FIG. 14, the spherical body 32 always cannot fall into the accommodating groove 41 under the condition of not overcoming a reset force due to the reset force of the pressure spring, and therefore, the locking operation member 4 can keep the cylinder 33 to be clamped in the positioning groove 11.

The present disclosure is further described in detail with reference to an embodiment 3.

Embodiment 3

Figure 18:
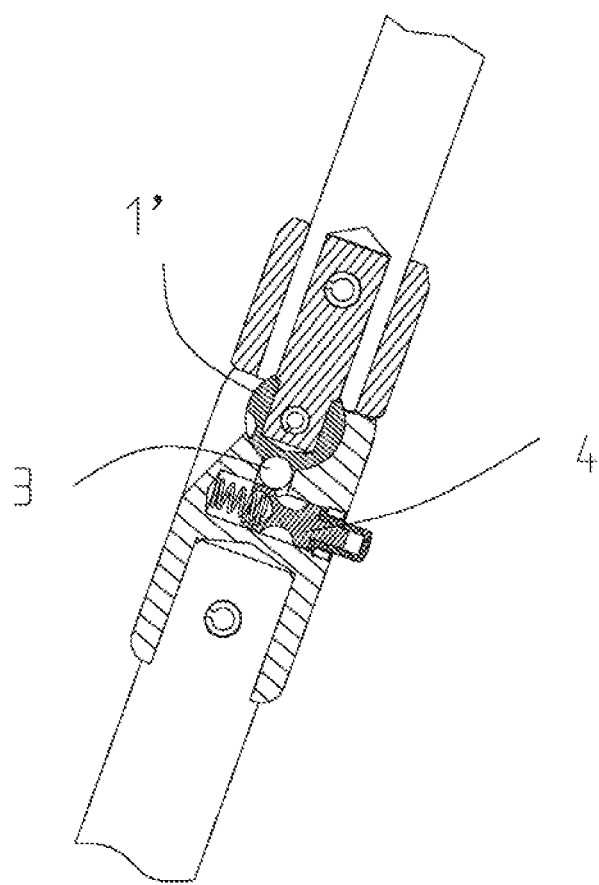
FIG. 18 is a section view of the embodiment 3 according to the present disclosure in a vertical locking state.
Figure 19:
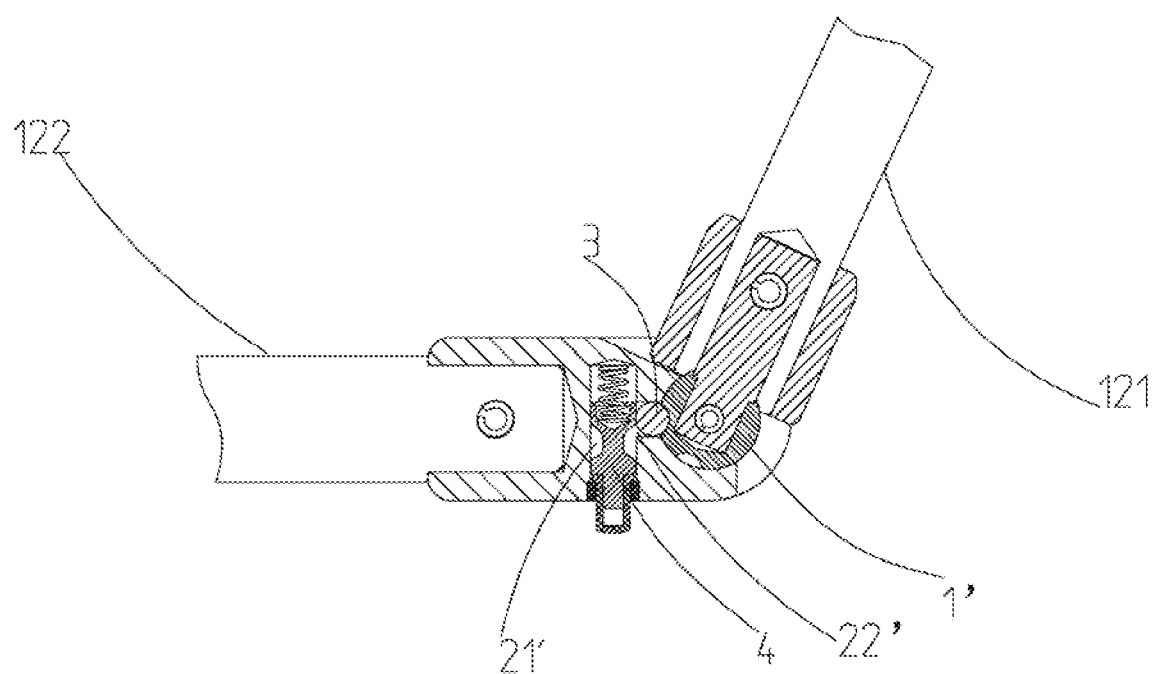
FIG. 19 is a section view of the embodiment 3 according to the present disclosure in a cross-break locking state.

With reference to FIG. 16 to FIG. 19, in order to ensure that a transverse arm 122 relative to a vertical arm 121 has no relative rotation after cross folder in the mechanical components, a positioning locking mechanism according to the present disclosure can be set to realize the condition, in the embodiment, the condition is realized through the following modes: the spindle 1′ is provided with a positioning groove 11, the rotational joint 9 is internally provided with a movable positioning member 3 and a locking operation member 4, the positioning member 3 can be a sphere 31 (such as a steel ball) or a columnar spherical body, the locking operation member 4 can push up and keep the positioning member 3 to be clamped in the positioning groove 11, wherein at an end part of the locking operation member 4, the locking operation member 4 can be provided with a reset spring to realize that the locking operation member 4 has the function of pushing up and keeping the state above, other structures such as an elastic rubber member can certainly be used to replace the reset spring above, and the positioning member 3 limits the rotation of the rotational joint 9 to realize the locking; and the locking operation member 4 is provided with an accommodating groove 41 used for containing the positioning member 3, the locking operation member 4 is operated, the positioning member 3 falls into the accommodating groove 41 to separate from the positioning groove 11, and the rotational joint 9 can be rotated to realize the unlocking. Specifically, FIG. 18 is the state of the transverse arm 122 in a vertical locking state, when the mechanical components in the embodiment need to be used, the transverse arm 122 is crossly broken to the state shown in FIG. 19, at the moment, the positioning member 3 is clamped in the positioning groove 11, the positioning member 3 relative to the positioning groove 11 cannot rotate around a spindle 1′, in the embodiment, the vertical arm 121 is rigidly connected to the spindle 1′ through a certain structure, the rotational joint 9 connected to the transverse arm 122 is limited by the positioning member 3 and cannot rotate or swing around the spindle either, and at the moment, the states of the transverse arm 122 and the vertical arm 121 are stable; when the mechanical components in the embodiment needing to be used are in a vertical locking state, the locking operation member 4 is pressed to enable the positioning member 3 to fall into the accommodating groove 41, so as to be separated from the positioning groove 11, the positioning groove 11 relieves the locking effect on the positioning member 3, and the transverse arm 122 connected to the rotational joint 9 can rotate around the spindle 1′ to the vertical locking state shown in FIG. 18.

Embodiment 4

Figure 20:
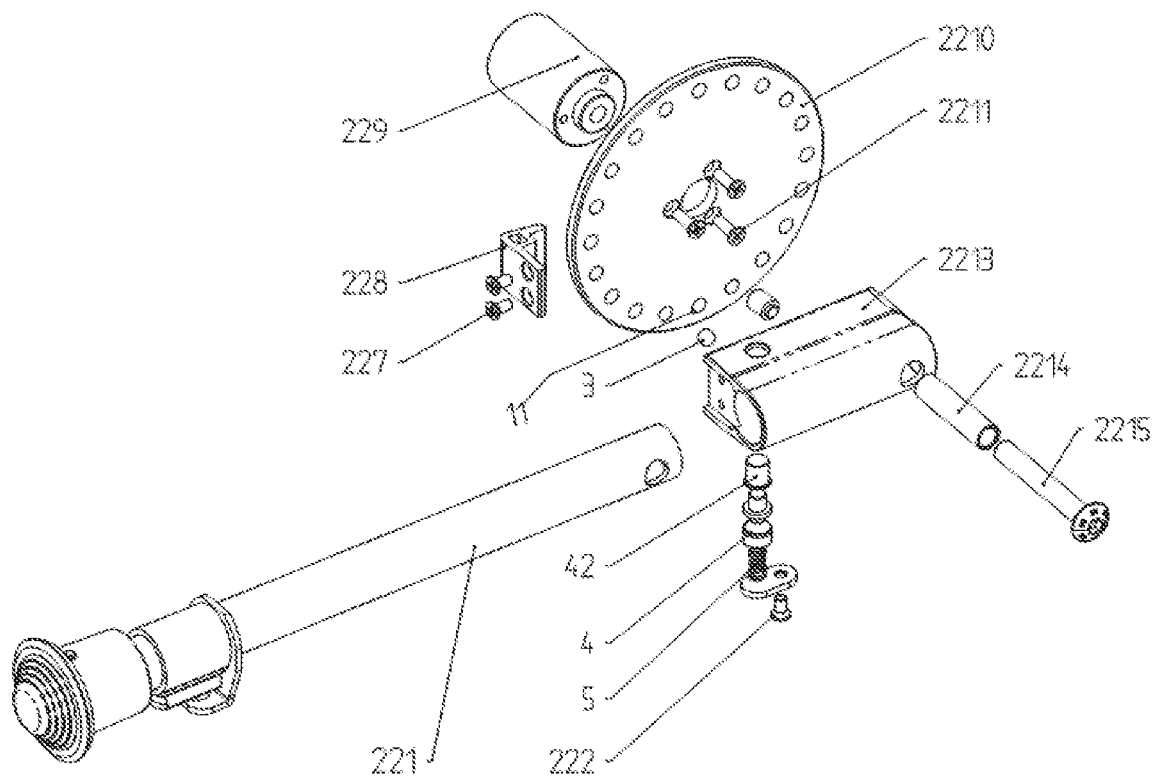
FIG. 20 is an exploded assembly view of an embodiment 4 according to the present disclosure.
Figure 21:
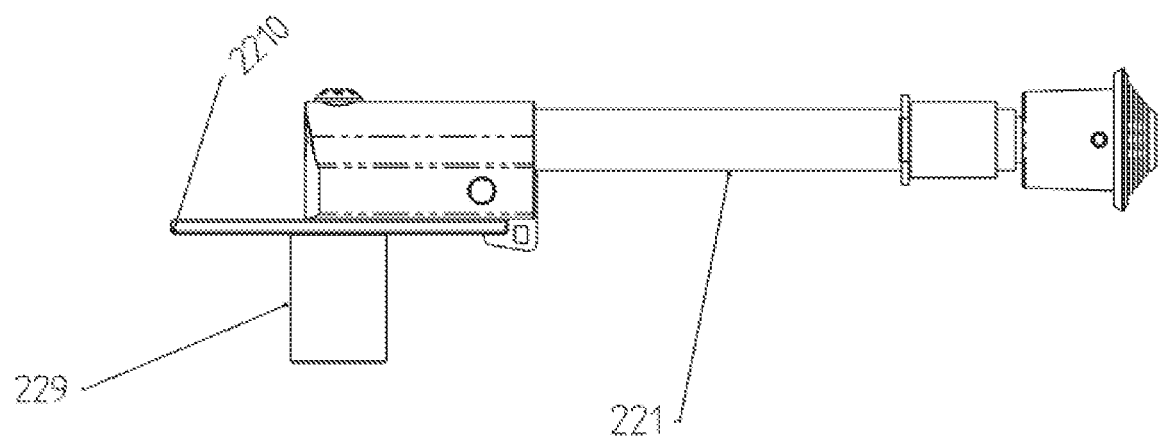
FIG. 21 is a top view of the embodiment 4 according to the present disclosure.
Figure 22:
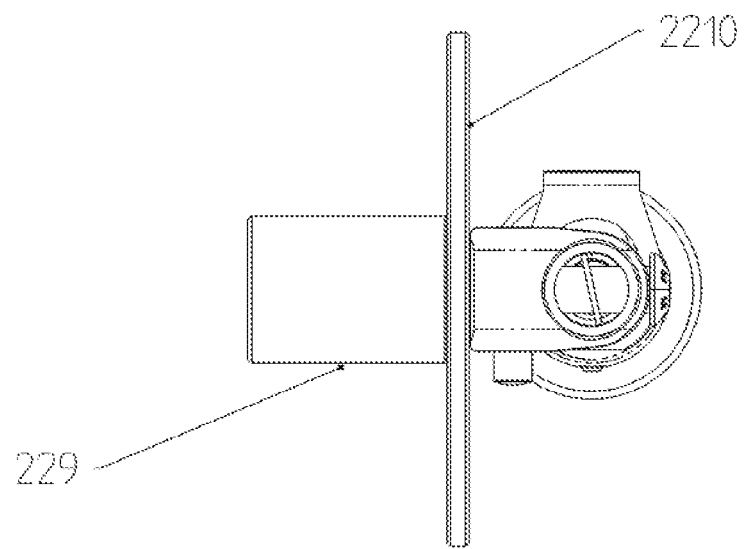
FIG. 22 is a rear view of the embodiment 4 according to the present disclosure.
Figure 23:
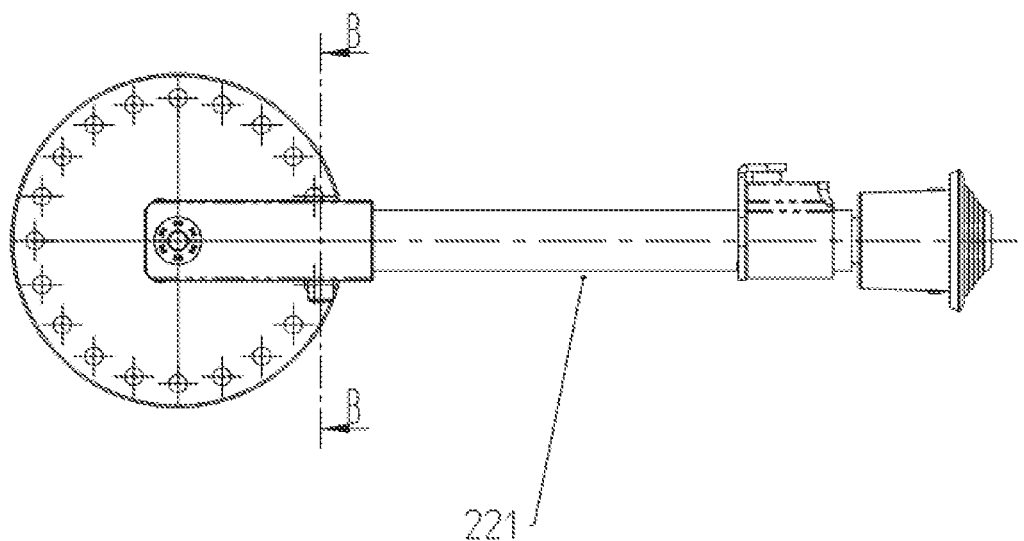
FIG. 23 is a side view of the embodiment 4 according to the present disclosure.
Figure 24:
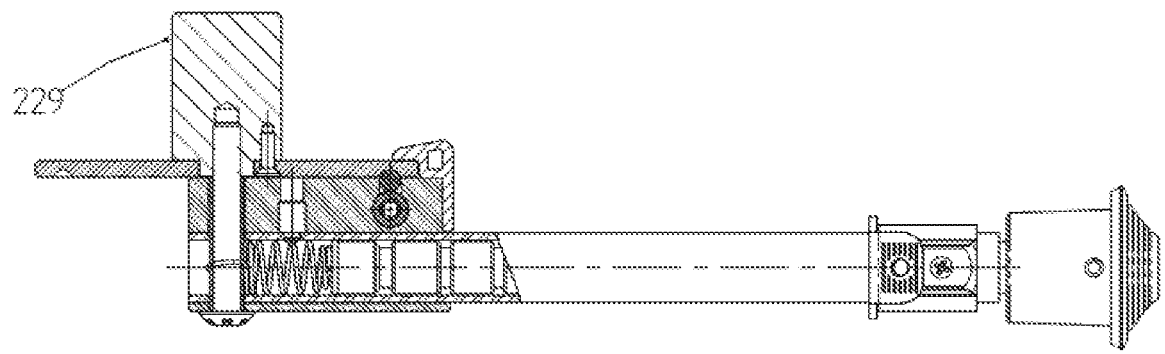
FIG. 24 is a cross section of a side view of the embodiment 4 according to the present disclosure.
Figure 25:
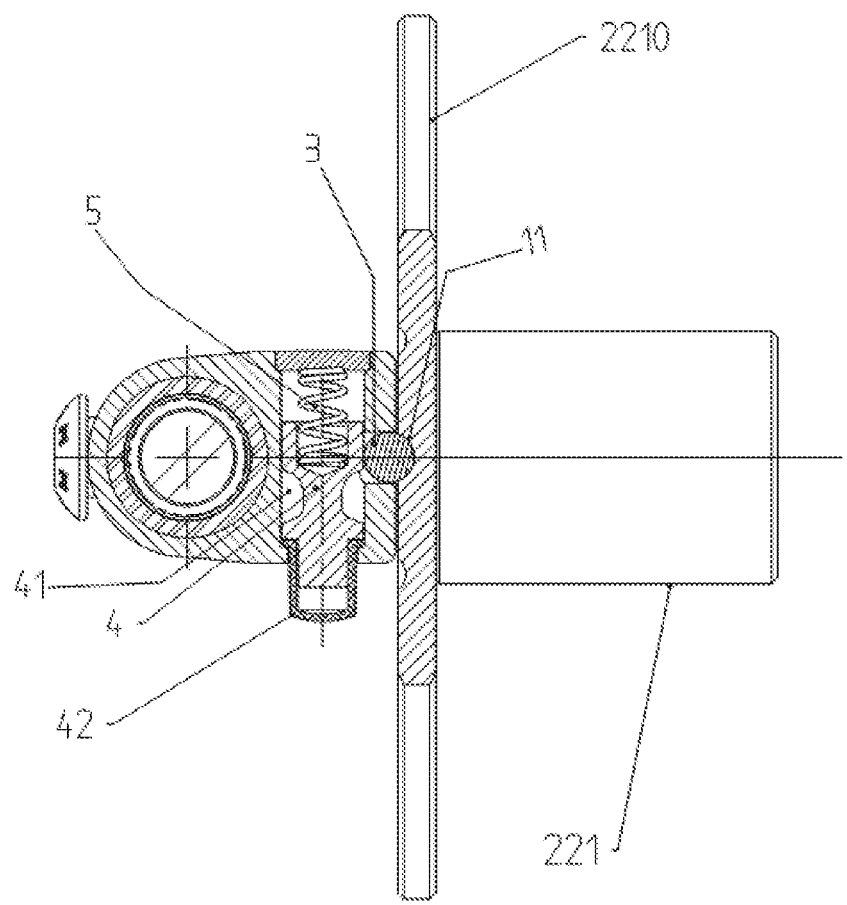
FIG. 25 is a B-B section view of FIG. 23.

With reference to FIG. 20 to FIG. 25, in order to realize that a rotational arm 221 can be locked at different angles after rotating relative to a rotational positioning plate 2210, the requirement can be achieved through providing a positioning locking mechanism according to the present disclosure. Wherein, the rotational positioning member is the rotational positioning plate 2210, and the rotational member is the rotational arm 221. With reference to FIG. 20, the rotational positioning plate 2210, a connecting and fixing column 229, a rotational arm connecting base 2213 and the rotational arm 221 are fixed and connected through a hollow shaft 2214 and an inner hexagonal pan-head screw 2215, and a first sunk screw 2211 is further arranged to be used for fastening the connection between the rotational positioning plate 2210 and the connecting and fixing column 229. The rotational arm connecting base 2213 is provided with a side baffle block 228, at one end of the rotational arm connecting base 2213, and the side baffle block 228 is fixed on the rotational arm connecting base 2213 through a second sunk screw 227. With reference to FIG. 25 further, the rotational arm connecting base 2213 is internally provided with a movable positioning member 3 and a locking operation member 4, the locking operation member 4 can push up and keep the positioning member 3 to be clamped in the positioning groove 11, wherein at an end part of the locking operation member 4, the locking operation member 4 may be provided with a reset spring to realize that the locking operation member 4 has the function of pushing up and keeping the state above. A limiting plate is fixed on the rotational arm connecting base 2213 through a third sunk screw 222 so as to install the locking operation member 4, etc. in the rotational arm connecting base 2213. The positioning member 3 limits the rotation of the rotational arm connecting base 2213 to lock the rotational arm connecting base 2213 to any positioning groove 11 of the rotational positioning plate 2210, and the positioning groove 11 may advantageously be made into a concave hole instead of a through hole to better provide a locking effect; the locking operation member 4 is provided with an accommodating groove 41 used for containing the positioning member 3, the locking operation member 4 is operated, such that the positioning member 3 falls into the accommodating groove 41 to separate from the positioning groove 11, the rotational arm connecting base 2213 can rotate to realize the unlocking, and the rotational arm 221 is driven to rotate while the rotational arm connecting base 2213 is operated to rotate.

It can be seen from the embodiment above that, compared with the conventional technology without the locking mechanism according to the present disclosure, a rotational member 2 in the present disclosure is additionally added with a positioning member 3 to conduct the limitation, so that the rotational member 2 cannot rotate, or get loose from a positioning due to the limiting effect of the positioning member 3 in the face of accident collision or other reasons, which ensures the firm locking of the rotational member 2 at a targeted angle and ensures the safety and reliability of the rotational member 2 in working; The positioning locking mechanism according to the present disclosure abandons the positioning and locking modes of bolt, pin, buckle, etc. in conventional technology, better solves the defects of conventional technology comprising complicated operation, difficult quick locking and unlocking, and has the advantages of simple and compact structure, simple operation, reliable locking, low cost, etc.

The description above includes some embodiments of the present disclosure, however the present disclosure is not limited to the embodiments above, and any identical or similar means reaching the technical effect of the present disclosure shall fall into the protection scope of the present disclosure.

What is claimed is:

1. A positioning locking mechanism of a rotational member, comprising:
    a rotational positioning member provided with a positioning groove;
    a rotational member pivotally connected with the rotational positioning member and rotating around the rotational positioning member, wherein the rotational member comprises a movable supporting leg;
    a positioning member arranged in the rotational member, and meshed with or separated from the positioning groove through a locking operation member; the positioning member is designed into a geometry adapted to and meshed with the locking operation member and the positioning groove; and
    the locking operation member is arranged in the rotational member to control the positioning member to be meshed with or separated from the positioning groove; the working mode of the locking operation member can be axial motion or radial rotation, wherein the movable supporting leg is internally provided with a fixing mount used for installing the locking operation member, and one end of the locking operation member extends out and is sleeved with an operating button;
    the movable supporting leg is provided with a radially penetrated containing hole; and
    the fixing mount in the containing hole further comprises an outer sleeve sleeved in the movable supporting leg, two ends of the fixing mount extend out from the containing hole and are butted with an inside wall of the outer sleeve and limited by the inside wall of the outer sleeve, and the outer sleeve is further provided with a hole site that is configured for the one end of the locking operation member to extend out and be sleeved with the operating button.

2. The positioning locking mechanism of a rotational member of claim 1, wherein the locking operation member is provided with an accommodating groove or an accommodating concave hole for containing the positioning member;
    wherein, when the locking operation member implements a locking motion, the positioning member is pushed up to enter the positioning groove under the rotational driving of the rotational member, the positioning member is kept to mesh with the positioning groove, and the rotational member cannot rotate thus realizing positioning and locking under the effect of the positioning member and the positioning groove; and
    when the locking operation member is operated to implement an unlocking motion, the locking operation member is pressed, the accommodating groove is moved to a position where the positioning member is located, and the positioning member falls into the accommodating groove to completely separate from the positioning groove, so that the rotational member can rotate to realize unlocking.

3. The positioning locking mechanism of a rotational member of claim 2, wherein one end of the locking operation member is connected to an elastic member, and the locking operation member pushes and keeps the positioning member to be meshed in the positioning groove under the effect of the elastic member.

4. The positioning locking mechanism of a rotational member of claim 3, wherein the elastic member is a pressure spring.

5. The positioning locking mechanism of a rotational member of claim 2, wherein a side wall of the accommodating groove is provided as an arc-shaped surface or an inclined plane that is easy to push up the positioning member.

6. The positioning locking mechanism of a rotational member of claim 5, wherein
    the positioning member is provided as a sphere or a columnar spherical body, wherein the end surface of the columnar spherical body is a cylindrical or rhombic body; or
    the positioning member is formed by a columnar spherical body or a similar sphere, and is matched with the positioning groove, one end of the similar sphere or the columnar spherical body is meshed with the positioning groove, and the other end of the similar sphere or the columnar spherical body is butted with the locking operation member; or
    the positioning member can be a geometry adapted to the positioning groove and the accommodating groove.

7. The positioning locking mechanism of a rotational member of claim 2, wherein the rotational positioning member is an installing support, and the movable supporting leg is pivotally connected to the installing support through a shaft.

8. The positioning locking mechanism of a rotational member of claim 7, wherein
    the fixing mount is internally provided with a third installation channel; and
    the locking operation member is installed in the third installation channel, and one end of the locking operation member extends out from the third installation channel.

9. The positioning locking mechanism of a rotational member of claim 8, wherein
    one end of the third installation channel is open, and the other end of the third installation channel is closed by a barrier wall; and
    the locking operation member is provided with a limiting convex ledge limited by the barrier wall.

10. The positioning locking mechanism of a rotational member of claim 8, wherein the positioning member is composed of a spherical body and a cylinder butted with the spherical body, wherein the cylinder is provided with a cylindrical top matched with the positioning groove, at an upper end surface of the cylinder, and the cylinder is provided with a contacting concave surface matched with the spherical body, at a bottom of the cylinder.

11. The positioning locking mechanism of a rotational member of claim 10, wherein
the fixing mount is provided with a fourth installation channel for installing the spherical body, and the fourth installation channel is communicated with the third installation channel;
the movable supporting leg is provided with an inner chamber communicated with the positioning groove, the cylinder is arranged in a bushing and is in sliding fit with the bushing, and the bushing is arranged in the inner chamber;
the spherical body is pushed up by the locking operation member, and pushes the cylinder to be clamped in the positioning groove, thus realizing positioning and locking; and
when the locking operation member is operated, the spherical body can fall into the accommodating groove through the fourth installation channel, and at the moment, the cylinder is separated from the positioning groove to realize unlocking.

12. The positioning locking mechanism of a rotational member of claim 7, wherein on the installing support, the positioning groove is arranged on a curved surface, a flat surface or a broken-line surface.

13. The positioning locking mechanism of a rotational member of claim 1, wherein the number of the positioning groove is one or more; and the positioning groove can be a groove, a concave hole, a round hole, or other suitable geometrical shapes.

14. The positioning locking mechanism of a rotational member of claim 2, wherein
the rotational positioning member is designed into a circular structure pivotally connected with the rotational member, and the rotational member is a rotational arm or an adjusting rod.

* * * * *